Figure 1:
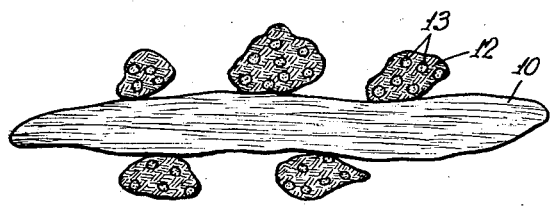

May 12, 1942.  S. MUSHER  2,282,788
DRY STABLE FOOD COMPOSITIONS
Filed March 11, 1942

INVENTOR
Sidney Musher
BY
ATTORNEY

Patented May 12, 1942

2,282,788

UNITED STATES PATENT OFFICE 2,282,788

DRY STABLE FOOD COMPOSITION

Sidney Musher, New York, N. Y., assignor to Musher Foundation Incorporated, New York, N. Y., a corporation of New York Application March 11, 1942, Serial No. 434,203

8 Claims. (Cl. 99—11)

This application relates to methods for producing dry granular or powdered stabilized molasses oil soluble vitamin containing food compositions whereby the glyceride oils and vitamins contained in the food compositions are substantially stabilized against oxidative deterioration.

It has been found that very satisfactory compositions of glyceride oil or oil soluble vitamin containing materials highly resistant to oxidative and light deterioration may be made by thoroughly dispersing these materials in molasses.

But the molasses containing compositions cannot be dried nor can they be readily mixed with various solid food ingredients for animal or human food purposes to form homogeneous compositions which will not speedily deteriorate upon exposure to air and light.

Where it is attempted to mix various brans or other cereal or seed materials with the molasses not only is it extremely difficult to get a homogeneous mixture, but the oxidative and light resistant qualities may be very seriously decreased.

It has now surprisingly been found where a cellulosic bran material having normally 8% or more moisture in finely divided form is dried to below 3% moisture, and desirably to less than 1.5% moisture, that the dried material has unusually effective dehydrative properties in respect to molasses containing compositions and will form a dry mixture with the molasses dispersion, and at the same time will also produce a highly stable vitamin composition.

The preferred brans are wheat bran, corn bran, oat bran, rice bran and the like, and this bran is desirably pre-dried by subjecting to an elevated temperature of between 135° and 200° F. or more, preferably by placing in a steam-jacketed vat with agitators, this predrying continuing either at atmospheric or reduced temperatures.

In accordance with the present invention, the oil soluble vitamin containing food compositions are first dispersed in molasses, preferably by a colloid mill treatment or by homogenization, or by other mechanical procedures whereby each particle of the vitamin containing food composition is covered by and suspended in molasses.

Following the drying of the bran material to less than 3% of moisture, the molasses dispersion of the oil soluble vitamin containing food composition is added to the bran with vigorous agitation at atmospheric pressure or under reduced pressure.

The molasses dispersion desirably should not exceed about 45% of the total weight of the carrier and the molasses dispersion, and preferably is 25% or less of the total weight of the finished composition.

The final composition comprising a minor amount of the molasses dispersion and a major amount of the bran is a free-flowing powdered composition which is altogether devoid of the sticky appearance of molasses and appears just like bran.

Among the various oil soluble vitamin containing food compositions that may be utilized in this manner, there are included particularly the fish and fish liver oils including cod liver oil, halibut liver oil, tuna liver oil, herring oil, salmon oil, menhaden oil, sardine oil, shark liver oil, etc., as well as their fat soluble vitamin concentrates including largely the unsaponifiable fraction extracted or removed therefrom which are all highly subject to oxidative deterioration, loss of vitamin A content and the development of rancidity, and which may be dispersed in molasses and then combined with the predried bran in the aforesaid manner.

In addition to vitamin A and the oils containing this fat soluble vitamin, its pro-vitamin carotene as well as oils in which it occurs such as alfalfa oil or extracts of the cereal grasses or other fodder and forage legumes and grasses and also the oils extracted from carrots and other vegetable plant materials high in carotene are readily subject to oxidative deterioration and may be utilized by the procedures of the present invention.

The other fat soluble vitamins may similarly be utilized, which other vitamins are similarly subject to deterioration upon standing or upon exposure to air and which include activated ergosterol or calciferol as one of the forms of vitamin $D_2$, as well as vitamin $D_2$ and also vitamin $D_3$ or 7-dehydro cholesterol together with other forms of vitamin D either in their pro-vitamin or natural form and whether produced synthetically or extracted by solvents or other special means, vitamin E or alpha-tocopherol and vitamin K including $K_1$ and $K_2$, whether extracted from natural sources such as by removal of the oil soluble substances present in alfalfa, cereal grasses, etc. and also the synthetic oil soluble vitamin product such as 1.4-naphthoquinone, and similar quinones.

These fat soluble vitamins which may be present either in substantially pure condition or dissolved in oil or which may be extracted from a natural source by removal of the glyceride oils as well as oil soluble vitamins from these substances or which may be prepared by special procedures such as by removal of the unsaponifiable fraction from the fish and fish liver oils are all readily subject to deterioration particularly when subjected to contact with water or when exposed to air.

Other oil soluble vitamin containing food compositions include the fodder and forage legumes and grasses such as alfalfa, red clover, spring vetch, winter vetch and soya beans and particularly their leaves and stalks as well as the cereal grasses and their leaves and stalks such as maize, sorghum, rye, oats, June grass and timothy. Dispersions may also be made of the cereal germs and polishes such as of wheat germ, rice polish, oat germ and similar vegetative oil soluble vitamin containing germ and embryo materials in the major body of molasses.

There may also be dispersed in the body of the molasses preliminary to processing in accordance with the present invention dehydrated fish meals or other animal meals, dehydrated fish liver meals, finely divided dehydrated fish livers such as those from the cod, halibut, shark, swordfish, tuna and salmon, and also the oils produced from said animal meals, animal livers, fish meals and fish livers, as well as the unsaponifiable portions removed therefrom by extraction procedures as by alcoholic extraction of the sterols contained therein.

It has been found that by this procedure the solid molasses residue appears to be adsorbed or absorbed as a thin film on to the surface of the predried bran.

The molasses film pulls the oil globule, glyceride oil or the vitamin material tightly or closely against the surfaces of the bran and the bran apparently absorbs the water of the molasses exerting a compressive effect on the vitamin containing composition and leaving the molasses solids in substantially dry condition.

There is diagrammatically shown in Fig. 1 the combination of bran in undried condition with a vitamin containing molasses emulsion in greatly magnified scale.

Figure 2:
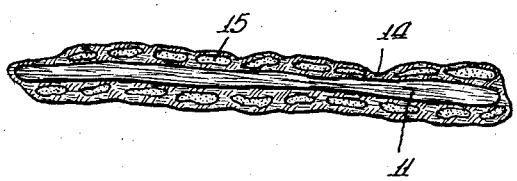

Fig. 2 is the same, except the bran is predried in accordance with the procedures of the present invention.

In Fig. 1 the particle of bran 10 is shown before drying in which condition it occupies a much greater volume than when predried as indicated in 11 of Fig. 2.

In Fig. 1 is shown the globules or particles of molasses 12 in which molasses is dispersed the globules 13 of the fish or vitamin oil.

It will be noted from Fig. 1 that the molasses stays in segregated masses on the surface of undehydrated bran in agglomerated large globules surrounded by air, with the result that the final composition made from ordinary bran is more readily subject to oxidation.

In Fig. 2 on the other hand the water in the molasses 14 has been absorbed into the dehydrated bran 11 with the result that the oil globules have been compacted to a flattened condition 15 and the solids of the molasses form an even plastic nondeliquescent dried film around the bran particles.

As the source of predried material, in addition to the brans such as wheat bran, barley bran, corn bran, oat bran, and rice bran, it is also desirable to use soya flour. There may also be used the cereals and oil bearing seeds and nuts, preferably in deoiled condition. The brans are however desirable for use in accordance with the present invention, and are to be preferred. Where seeds and nuts or the special cereal materials such as the cereal germs have in excess of 20% total oil content, they should be used in the form of their deoiled cakes which may be available in finely divided or finely ground form.

It is also possible to use hays having a high cellulosic fibre content such as alfalfa hay, barley hay, clover hay, corn fodder and oat hay.

These materials in their normal condition contain not less than 8% total moisture and they are not satisfactory for use in accordance with the present invention until they have been dried to an abnormally low moisture content at which they will be come strongly water absorbent.

The final product obtained in accordance with the present invention is not only available in dry powdered or finely divided condition in which they may be exposed to air without the deliquescent characteristic of dehydrated molasses, but in addition the vitamin content and digestible nutrients are substantially stabilized against oxidative deterioration.

For example, where alfalfa, cereal grasses, fish or fish livers or their vitamin containing oil soluble or water insoluble extracts are dispersed in blackstrap molasses and then combined, for example, with predried wheat bran or soya bean meal, not only is the vitamin A or carotene stabilized against oxidative deterioration, but the vitamin K and other oil soluble vitamins are similarly stabilized and the value of the finished product from the standpoint of its nutritional properties is greatly enhanced and improved.

Even where these dry products produced in accordance with the present invention are stored for periods of four to six months under room temperature conditions with exposure to air, the vitamins contained therein are stabilized so that there is practically no loss over that period.

In addition to protection against deterioration of the vitamins, this treatment also affords protection against loss in protein digestibility and tends to retain the biological value of the protein and fats contained in the materials dispersed in the molasses.

For example, where dehydrated cod livers, fish livers, horse livers, or other animal livers or meals are dispersed in the molasses in finely divided form and then combined with the predried bran of the present invention, the protein is retained in a condition of enhanced digestibility.

In the combination of the molasses dispersion with the predried bran it is undesirable to incorporate more than about 40% by weight against the weight of the total finished combination so that the final product will contain at least 60% of the predried bran by weight and preferably 75% by weight of the predried bran.

It has been found particularly desirable in the preparation of the molasses dispersion for use in accordance with the present invention for that dispersion to be adjusted to a pH of between 4.0 and 5.0 prior to incorporation with the predried bran. The maintenance of the pH at between 4.0 and 5.0 appears to enhance the stability characteristics of the final dry product.

This pH adjustment can be made by the addition of sulphuric acid, hydrochloric acid, or the weaker acids such as lactic acid, acetic acid or tartaric acid. It is desirable, however, for the pH adjustment of the molasses to be made prior to incorporating or dispersing the vitamin containing food composition therein.

It has also been found desirable for the molasses dispersion to be subjected to an elevated temperature treatment of at least about 150° F. for a period of from 5 minutes to 30 minutes or more and desirably up to 200° F. or more after making the dispersion of the oil soluble vitamin product in the molasses in order to enhance the antioxygenic or preservative effect.

It has been found particularly desirable to conduct this elevated temperature treatment in the absence of air, in the presence of an inert gas or under sub-atmospheric pressure. The mixing operation may be conducted in closed vessels or in a closed system by permitting the molasses dispersion to flow through coils which are immersed in a heated bath or to place the molasses dispersion in a closed jacketed kettle. This may be done under sub-atmospheric pressure or under inert gas such as nitrogen and the elevated temperature treatment will then develop the antioxygenic effect to a more marked degree without at the same time permitting oxidation to occur.

The heat treated oil soluble vitamin molasses composition may then be combined with the predried bran.

It has been found particularly desirable to utilize for the purpose of the present invention blackstrap molasses, which is the non-crystallizable fraction obtained in the manufacture of cane and beet sugars, such as cane molasses or beet molasses. Although blackstrap molasses is the desired product, there may also be employed sorghum molasses, invert molasses and edible or refinery molasses.

Where it is found that the molasses is too heavy or viscous or has too high a Baumé to be satisfactorily used as the medium in which the oil soluble vitamin containing product is dispersed, it may be diluted with water to a satisfactory Baumé so that it is sufficiently free flowing to be handled through a colloid mill or homogenizer and for use as the dispersing medium.

Where edible molasses is used, it may be desirable to add from 0.5% to 5% by weight of other edible gums such as gum tragacanth, gum karaya, gum arabic, gum guaiac, or agar agar or similar mucilaginous product in order to increase the total quantity of mucilaginous constituents in the molasses and in order to hold the vitamin oil containing composition in suspension more thoroughly.

With the procedure of the present invention, however, the presence of gum constituents in the molasses is not nearly so important because it is preferable for the dispersion to be combined with the predried bran immediately after the dispersion or homogenization has been completed and before any of the vitamin oil globules will have an opportunity to coalesce or to aggregate toward the top of the container in which the dispersion is placed.

When the oil soluble vitamin containing forage and fodder legumes and grasses, including the cereal grasses, are utilized for dispersion in the blackstrap molasses, these products should first be dehydrated preferably at an elevated temperature and without exposure to sunshine or without having been sun dried, sun cured, or dried in the fields. These products should also be finely divided to at least 25 mesh before being incorporated or dispersed in the blackstrap molasses.

There may also be combined with the molasses used as the dispersing medium a minor amount of inactivated yeast or its water or alcohol soluble extract such as from 5% to 25% by weight against the weight of the molasses.

Where yeast or its water or alcohol soluble extracts are combined with the blackstrap molasses in a minor proportion and the molasses containing in disperse form the vitamin oil composition then combined with the predried bran of the present invention, not only is the vitamin oil stabilized against oxidative deterioration, but furthermore the riboflavin content in the yeast or its extract is also stabilized against oxidative deterioration. In a similar manner, riboflavin can be used for combination with the molasses as the continuous medium through which the vitamin oil is dispersed.

This appears to be of great importance from the standpoint of riboflavin oxidation since riboflavin is one of the compounds readily subject to oxidative deterioration and it is difficult to make it available in dry powdered form without being subject to loss particularly when it is to be used in combination with mineral feeds or other similar products.

In addition to protecting against loss of carotene and the pro-vitamin A or similar fat soluble vitamins, the loss of vitamin C or ascorbic acid is also retarded.

There may also be utilized together with or in lieu of the blackstrap molasses employed in the present invention the highly active antioxygenic extracts of blackstrap molasses and particularly those obtained by the use of an alcohol solvent. For example, blackstrap molasses may be extracted by the use of methyl alcohol, ethyl alcohol, propyl alcohol or butyl alcohol, and the extract thus obtained, after removal of the solvent therefrom, may be utilized in accordance with the present invention and has marked antioxygenic action. Preferably, the molasses is first dehydrated to substantial dryness before extraction in order to facilitate removal of the potent antioxygenic materials contained in the molasses.

The seed and nut flours including soya flour, peanut flour and cottonseed meal are referred to herein as the seeds.

The present application is a continuation in part of application, Serial No. 330,985 filed April 22, 1940, and through said application continues the subject matter of the applications which matured into Patents 2,198,210, 2,198,214 and 2,198,218.

Having described my invention, what I claim is:

1. A process of producing dry stabilized food compositions which comprises forming a dispersion of a minor amount of an oil soluble vitamin concentrate in a major amount of molasses, drying wheat bran normally having in excess of 8% moisture to less than 3% moisture and then combining said dried wheat bran with a minor amount of said molasses dispersion whereby the molasses is absorbed and converted into dry form and there is obtained a homogeneous, dry, stable vitamin containing food composition.

2. A process of producing dry stabilized food compositions which comprises forming a dispersion of a minor amount of an oil soluble vitamin concentrate in a major amount of molasses, drying a bran material normally having in excess of 8% moisture to less than 3% moisture and then combining said dried bran material with a minor amount of said molasses dispersion whereby the molasses is absorbed and converted into dry form and there is obtained a homogeneous, dry, stable vitamin containing food composition.

3. A process of producing dry stabilized food compositions which comprises forming a dispersion of a minor amount of an oil soluble vitamin food composition in a major amount of molasses, drying a bran material normally having in excess of 8% moisture to less than 3% moisture and then combining said dried bran material with a minor amount of said molasses dispersion whereby the molasses is absorbed and converted into dry form and there is obtained a homogeneous, dry, stable vitamin containing food composition.

4. A process of producing dry stabilized food compositions which comprises forming a dispersion of a minor amount of an oil soluble vitamin concentrate in a major amount of molasses, drying a vegetative material normally having in excess of 8% moisture to less than 3% moisture and then combining said dried vegetative material with a minor amount of said molasses dispersion whereby the molasses is absorbed and converted into dried form and there is obtained a homogeneous, dry, stable, vitamin containing food composition, said vegetative material selected from the group consisting of the seeds and cereals and their brans and the fodder and forage legumes and grasses.

5. A process of producing dry stabilized food compositions which comprises forming a dispersion of a minor amount of an oil soluble vitamin food composition in a major amount of molasses, drying a vegetative material normally having in excess of 8% moisture to less than 3% moisture and then combining said dried vegetative material with a minor amount of said molasses dispersion whereby the molasses is absorbed and converted into dried form and there is obtained a homogeneous, dry, stable, vitamin containing food composition, said vegetative material selected from the group consisting of the seeds and cereals and their brans and the fodder and forage legumes and grasses.

6. A process of producing dry stabilized food compositions which comprises forming a dispersion of a minor amount of an oil soluble vitamin concentrate in a major amount of molasses, drying soya flour normally having in excess of 8% moisture to less than 3% moisture and then combining said dried soya flour with a minor amount of said molasses dispersion whereby the molasses is absorbed and converted into dried form and there is obtained a homogeneous, dry, stable, vitamin containing food composition.

7. A homogeneous, dry, stabilized food composition comprising a minor proportion of a molasses dispersion in dry form absorbed upon a major proportion of a predried bran material, said molasses dispersion comprising a dispersion of a minor amount of an oil soluble vitamin food composition in a major amount of molasses.

8. A homogeneous, dry, stabilized, food composition comprising a minor proportion of a molasses dispersion in dry form absorbed upon a major proportion of a predried vegetative material, said molasses dispersion comprising a dispersion of a minor amount of an oil soluble vitamin food composition in a major amount of molasses, said vegetative material selected from the group consisting of the seeds and cereals and their brans and the fodder and forage legumes and grasses.

SIDNEY MUSHER.